United States Patent [19]

Wing

[11] Patent Number: 4,941,358
[45] Date of Patent: Jul. 17, 1990

[54] PROCESS FOR PROOFING A THREADED JOINT

[76] Inventor: George S. Wing, 531 Esplanade, Apt. 515, Redondo Beach, Calif. 90277

[21] Appl. No.: 315,472

[22] Filed: Feb. 24, 1989

[51] Int. Cl.⁵ .............................................. F16B 31/02
[52] U.S. Cl. .......................................... 73/761; 411/6; 411/8; 411/369
[58] Field of Search .............................. 73/761, 862.21; 411/1-3, 6, 8-10, 368-370, 531

[56] References Cited

U.S. PATENT DOCUMENTS

| | | | |
|---|---|---|---|
| 2,824,481 | 2/1958 | Johnson | 411/8 |
| 3,495,907 | 2/1970 | Rogers | 73/761 |
| 3,759,119 | 9/1973 | Wing . | |
| 3,803,793 | 4/1974 | Dahl | 403/408.1 |
| 4,102,182 | 7/1978 | Brown et al. | 73/761 |
| 4,295,761 | 10/1981 | Hansen | 411/1 |
| 4,530,629 | 7/1985 | Sakow | 411/531 |

Primary Examiner—Robert Raevis
Attorney, Agent, or Firm—Christie, Parker & Hale

[57] ABSTRACT

A threaded fastener joint is proofed by a wrenching washer between the fasteners of the joint and the work. The wrenching washer has the clamp-up load applied by the fasteners to the work applied through it. After an attempt to make the joint, the wrenching washer is torqued to determine whether it turns on the work at an applied torque below some predetermined proofing torque. If it does not, the joint is satisfactory; if it does, the joint is unsatisfactory.

6 Claims, 1 Drawing Sheet

PROCESS FOR PROOFING A THREADED JOINT

BACKGROUND OF THE INVENTION

The present invention relates to making threaded joints and in particular to a process for proofing threaded joints to determine if they are satisfactory.

A threaded joint comprises work, an externally threaded fastener, and an internally threaded fastener. The externally threaded fastener operates with the internally fastener to apply an axial clamp-up load to the work, that is a compressive load to the work. Many threaded joints exist. One type has an externally threaded stud attached to the work with a threaded connection and which has a threaded section extending from the work for accepting a nut; an example of this type of joint is the lug bolts and nuts that attach a car wheel to its axle. A second type of joint uses a bolt that attaches directly to the work through a threaded connection; an example of this type of joint again is in the attachment of a wheel to its axle, but this time by lug bolts that thread into internal threads of the axle. A third type of joint uses a head of a bolt to bear on one side of the work and cooperates with a nut on the other side of the work to apply the load, with one or the other being permanently attached to the work, as by a weld. Another type of joint is the common and familiar one of a nut and a bolt that attach to the work only when used together; the nut and bolt being otherwise free. Nut and bolt joints can be press fit with a shank of a bolt in interference with the hole walls that it is in or with a clearance between the hole walls and shank.

All of these joints rely on an axial load applied to the work for their effectiveness. Without the desired clamp-up loads, the joints are failures. Sometimes threaded connections will appear to have desired axial loads, when in fact they do not. There are many reasons for this. Quite often, the torque applied to the fasteners in making a joint is used as a means to determine whether desired loads exist. Ideally, torque and clamp-up load correlate so that the amount of torque applied in making a joint indicates the amount of clamp-up load on the work. Unfortunately, the torque applied in making a joint is not always a fool proof sign of adequate clamp-up. Torque and clamp-up load correlate only when frictional resistance to turning between the fastener threads and between the work and the fasteners is within acceptable limits. Frictional resistance can increase beyond acceptable limits through different agencies. For example, damaged threads of the fasteners can increase the resistance to torque, indicating an achieved level of clamp-up much higher than the actual clamp-up. Increased frictional resistance that can result in a false indication of achieved load can also result from poorly performing prevailing torque lock nuts. (Nuts that use friction between their threads and the threads of cooperating fasteners to prevent joints from vibrating loose.) When the frictional resistance between the threads in prevailing torque lock, nut systems is too high, the torque level indicating desired clamp-up again does not correlate with the actual clamp-up, which is too low. Without exhausting all the causes of the failure of indicated torque to show actual clamp-up, other causes include a nut "shanking" on an unthreaded shank of a bolt and externally threaded fasteners bottoming in tapped holes. In either of the latter two cases, the indicated torque can be quite high while the actual clamp-up applied by the fasteners to the work can be zero.

Accordingly, there is a need for a method of determining whether threaded fasteners apply desired clamp-up load on work regardless of the setting torque applied to the fasteners.

SUMMARY OF THE INVENTION

The present invention provides a process for proofing a threaded joint to be sure that a desired clamp-up load is applied to the work of the joint. The joint has an externally threaded fastener, an internally threaded fastener, and a wrenching washer. The wrenching washer can accept a wrenching tool. The process contemplates making the joint in a standard way with the threaded fasteners. The fasteners are assembled with the wrenching washer between the fasteners and the work so that the washer is axially loaded by the fasteners and the work with the clamp-up load the work experiences. The fasteners are tightened. After tightening, a proofing torque is applied to the wrenching washer to determine whether it can accept a predetermined level of torque before turning on the work. If it can, the joint has been proofed. If it cannot, the joint does not have the proper clamp-up load.

The wrenching washer has the clamp-up load applied to the work applied to it as well. Friction between it and the work resulting from the clamp-up force applied to it is used to proof the joint. Proofing torque will normally not be the same as setting torque. The proofing wrenching washer is isolated from the threaded engagement between the fasteners of the joint. It also rests directly on the work at all times. Consequently, the conditions that can create error in the correlation between torque applied to fasteners and the clamp-up loads the fastener applies to the work are isolated from the washer. The proofing washer can serve the functions of washers: it can prevent damage to the work by preventing rotational engagement of the work; it can even out irregularities that would otherwise adversely affect joint performance; it can also reduce the unit loading applied to the work.

In a specific form, the present invention contemplates engaging an externally threaded fastener and the work that is to form a part of the joint. With a bolt, engagement may be done by simply slipping the bolt into the hole or holes in the work that it is to be in. With a stud and some bolts, engagement may be done by threading the stud into a threaded recess in the work. The internally threaded fastener is engaged with the external thread of the externally threaded fastener; with a nut and bolt, the nut is simply threaded onto the bolt. With studs and bolts used with threaded workpieces, engagement occurs by threading the studs and bolts into the threads of the workpieces. The wrenching washer is placed in the path of the clamp-up load that results from tightening the two fasteners; in the case of a nut and bolt, the wrenching washer can be placed under the head of the bolt or between the nut and the work. The fasteners are then tightened an amount to attempt to apply a desired value of the axial load on the work through the washer. Thereafter, a proofing torque is applied through the wrenching surface to the washer to determine whether the washer rotates upon the application of a predetermined value of proofing torque. If the washer resist the proofing torque and does not turn, the joint is good. If it does turn, the joint does not have the desired load on it.

If the wrenching washer turns during the application of the proofing torque, the joint is preferably torn down and rebuilt after having corrected the condition that prevented satisfactory proofing. When the steps just outlined are performed again.

When the limits of the proofing torque are to be closely controlled to determine clamp-up load, for example, a second washer between the wrenching washer and the work provides a controlled faying surface that limits the range of the torque at which the wrenching washer turns.

These and other features, aspects and advantages of the present invention will become more apparent from the following description, appended claims and drawings.

DESCRIPTION OF THE PREFERRED EMBODIMENT

Figure 1:
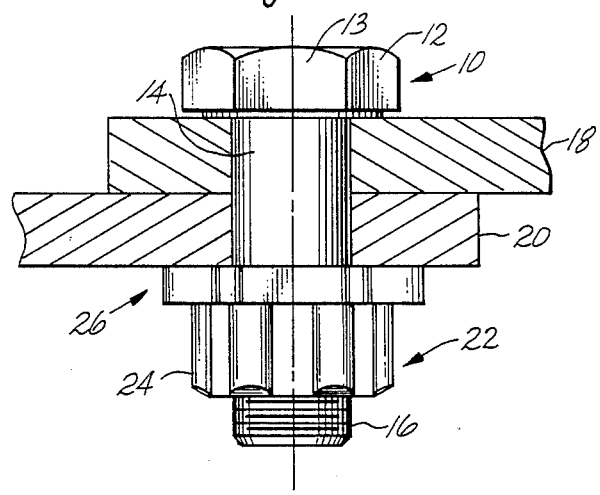
FIG. 1 is an elevational view, partly in half-section, illustrating the principles of the preferred embodiment of the process of the present invention.
Figure 2:
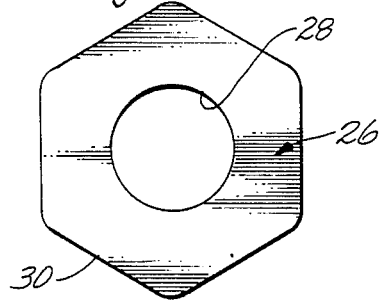
FIG. 2 is a plan view of the wrenching washer used in the proofing process of the present invention.

With reference to FIGS. 1 and 2, an externally threaded fastener 10 in the form of a bolt has a head 12 with wrenching flats 13, an unthreaded shank 14, and a threaded end 16, in a standard manner. The unthreaded shank is in aligned holes in a pair of workpieces 18 and 20 that constitute the work to be joined by the fastener. An internally threaded fastener in the form of a nut 22 has an internal thread engaged with the external thread of the bolt. The nut shown has splines 24 for accepting a wrenching torque. A wrenching washer 26 between nut 22 and workpiece 20 feels the clamp-up load applied to the work by the head of the bolt and the nut; it is in series between the work and the nut. As seen in FIG. 2, the wrenching washer has an axial bore 28 that receives the shank of the bolt. The wrenching washer has wrenching flats (wrenching surface) 30 for receiving a wrenching tool for the proofing of the joint.

The wrenching washer does not engage the bolt so that it is in pure series force relationship between the nut and the work without the bolt interfering with this relationship in any way. The bolt also does not interfere rotationally with the washer. This can be readily achieved by making bore 28 slightly larger than the portion of the bolt that it fits around. The washer directly engages the work at all times without interference from the bolt.

As is well known, the torque applied to the fasteners in a threaded fastener joint should correlate with the axial clamp-up load applied by the fasteners to the work. This axial clamp-up load is the load acting between the head of the bolt and the nut on the work that clamps the pieces of the work together. This load parallels the axes of the components of the fastener system. Upon tightening of the nut on the thread of the bolt, the torque applied to the nut increases. At some level, the torque will correspond to the desired clamp-up load in an ideal joint. The applied torque can be measured by torque wrench, by torque control collar or by a torque control application tool, by way of examples.

The ideal correlation between the torque applied to the fasteners and the clamp-up load that the fasteners apply to the work sometimes does not occur. As stated in the "Background of the Invention" section of this specification, when the applied torque must overcome more torque than considered in arriving at the design torque that indicates clamp-up load, the applied torque does not correspond to the desired clamp-up load. Examples of this include bad prevailing torque locks, cross-threading, and damaged threads. The other reason why applied torque does not always correlate with a clamp-up load is the shanking of the nut on the bolt. This occurs in the FIG. 1 illustration when nut 22 threaded on thread 16 engages unthreaded shank 14 before applying load to workpieces 18 and 20. When shanking occurs, no load at all is applied to the workpieces.

The process of the present invention contemplates proofing the joint effected by the threaded fasteners as follows:

The fasteners are assembled in the work in a standard manner. Thus, the fastener are in position to clamp the workpieces between them. The wrenching washer is interposed between the fasteners and the work. As shown in FIG. 1, wrenching washer 26 is interposed between nut 22 and workpiece 20 around bolt 10. With the tightening of nut 22 on the thread of bolt 10, the fasteners apply a clamp-up load to workpieces 18 and 20. At a predetermined applied torque, tightening ends. Thereupon, washer 26 is wrenched. If the washer does not rotate at the applied proofing torque, then the joint is good. If the washer does rotate with respect to the work at or below the proofing torque, then the joint is bad; the joint, then, should be dismantled, the condition that made it bad corrected, the joint reassembled, and reproofed.

Figure 3:
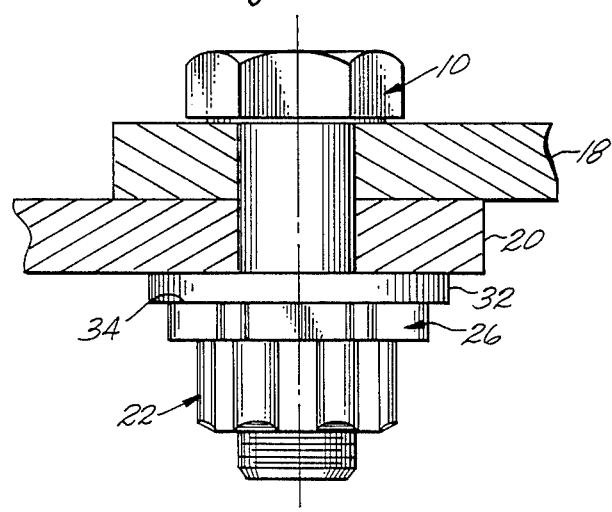
FIG. 3 is a view illustrating an additional step in the process of the present invention.

FIG. 3 shows the same fastener system shown in FIG. 1, except a second washer 32 between wrenching washer 26 and workpiece 20 isolates the wrenching washer from the workpiece for a controlled proofing torque. This isolation controls the spread in the values of the proofing torque. It does this by providing a controlled faying surface 34 between washer 26 and the second washer that has desired friction characteristics. Further, washer 32 can be made hard to again control the faying surface. With this second washer, proofing torque readily and accurately correlates with clamp-up load.

The process of the present invention is very simple. Yet it produces good proofing of joints. It does this with a washer that can serve the usual purpose of a washer acting between the work and the nut or between a bolt head and the work.

The present invention has been described with reference to a preferred embodiment. The spirit and scope of the appended claims should not, however, necessarily be limited to this description.

I claim:

1. A process for proofing a threaded joint of work, an externally threaded fastener bearing on one side of the work, and an internally threaded fastener threaded onto the externally threaded fastener and bearing on the other side of the work, the two fasteners applying a clamp-up load to the work, the process comprising:
    (a) engaging the externally threaded fastener and the work, with the external thread of the fastener extending from the work after such engagement;
    (b) placing a wrenching washer over the externally threaded fastener in the path of the clamp-up load;

(c) engaging the thread of the internally threaded fastener with the external thread;

(d) tightening the internally threaded fastener on the external thread to attempt to apply a desired value of the clamp-up load on the work through the washer and form a joint; and (e) applying a proofing torque through the wrenching surface of the wrenching washer to determine whether it resists the application of a predetermined proofing torque before turning, whereby, the joint is proofed and has the desired value of clamp-up load if the wrenching washer resists the predetermined proofing torque without turning.

2. The process for proofing a threaded joint claimed in claim 1 wherein the wrenching washer turns before the application to it of the proofing torque, and including the steps of breaking down the joint to determine why the wrenching washer would not accept the proofing torque, attempting to correct the condition that prevented the wrenching washer from accepting the proofing torque for a subsequent attempt to apply such torque, and then repeating the steps of claim 1.

3. The process for proofing a threaded joint claimed in claim 1 wherein the wrenching washer is on the externally threaded fastener between the internally threaded fastener and the work.

4. The process for proofing a threaded joint claimed in claim 1 including placing a second washer between the wrenching washer and the work to provide a controlled faying surface between the wrenching washer and the second washer and close limits to the value of the proofing torque.

5. The process for proofing a threaded joint claimed in claim 4 wherein the wrenching washer turns before the application to it of the proofing torque, and including the steps of breaking down the joint to determine why the wrenching washer would not accept the proofing torque for a subsequent attempt to apply such torque, and then repeating the steps of claim 4.

6. The process for proofing a threaded joint claimed in claim 4 wherein the wrenching washer is on the externally threaded fastener between the internally threaded fastener and the work.

* * * * *

UNITED STATES PATENT AND TRADEMARK OFFICE
CERTIFICATE OF CORRECTION

PATENT NO. : 4,941,358
DATED : July 17, 1990
INVENTOR(S) : George S. Wing

It is certified that error appears in the above-identified patent and that said Letters Patent is hereby corrected as shown below:

Column 1, line 11, change "operates" to -- cooperates --.
Column 1, line 48, before "frictional" insert -- the --.

Column 3, line 4, change "When" to -- Then --.

In the Claims

Column 6, line 16, after "torque" insert --, attempting to correct the condition that prevented the wrenching washer from accepting the proofing torque --.

Signed and Sealed this

Twenty-fourth Day of September, 1991

Attest:

HARRY F. MANBECK, JR.

Attesting Officer

Commissioner of Patents and Trademarks